United States Patent
Li et al.

(10) Patent No.: US 12,528,829 B1
(45) Date of Patent: Jan. 20, 2026

(54) CALCIUM-BASED METAL-ORGANIC FRAMEWORK MATERIAL, METHOD FOR MAKING THE SAME, AND USE IN CARBON DIOXIDE CAPTURE

(71) Applicant: Beijing University of Technology, Beijing (CN)

(72) Inventors: Jianrong Li, Beijing (CN); Wenliang Li, Beijing (CN); Jiamei Yu, Beijing (CN); Linhua Xie, Beijing (CN)

(73) Assignee: Beijing University of Technology, Beijin (CN)

( * ) Notice: Subject to any disclaimer, the term of this patent is extended or adjusted under 35 U.S.C. 154(b) by 0 days.

(21) Appl. No.: 19/023,391

(22) Filed: Jan. 16, 2025

(30) Foreign Application Priority Data

Nov. 8, 2024 (CN) .......................... 202411595138.0

(51) Int. Cl.
*C07F 3/00* (2006.01)
(52) U.S. Cl.
CPC .................................... *C07F 3/003* (2013.01)
(58) Field of Classification Search
CPC ....................................................... C07F 3/003
See application file for complete search history.

(56) References Cited

PUBLICATIONS

First notice of examination opinions Dated Mar. 27, 2025 for corresponding Chinese Application No. 202411595138.0 along its English Translation.
(Yiwen Tang et al.), "Coordination polymers from alkaline-earth nodes and pyrazine carboxylate linkers", (Dalton Trans), (Jul. 4, 2018), vol. 47, pp. 10071-10079.

*Primary Examiner* — Golam M Shameem (57) ABSTRACT

The present disclosure provides a calcium-based metal-organic framework material, the calcium-based metal-organic framework material is a porous material with a three-dimensional framework structure formed by self-assembly coordination of a metal ion $Ca^{2+}$ and an organic ligand 2,5-pyrazinedicarboxylic acid; a structural formula of the 2,5-pyrazinedicarboxylic acid is

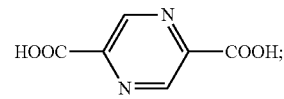

the three-dimensional framework structure is formed by a coordination bond between a one-dimensional calcium chain and a nitrogen atom and an oxygen atom in the organic ligand; and the one-dimensional calcium chain is provided with a broken line shape, and includes a plurality of mononuclear calcium nodes; and each of the plurality of mononuclear calcium nodes is provided with an eight-coordinated mode.

4 Claims, 6 Drawing Sheets

CALCIUM-BASED METAL-ORGANIC FRAMEWORK MATERIAL, METHOD FOR MAKING THE SAME, AND USE IN CARBON DIOXIDE CAPTURE

CROSS-REFERENCE TO RELATED APPLICATIONS

The present application claims priority of Chinese Patent Application No. 202411595138.0, filed on Nov. 8, 2024, the entire contents of which are hereby incorporated by reference.

TECHNICAL FIELD

The present disclosure relates to the field of a crystalline material, and in particular to a calcium-based metal-organic framework material, a method for making the same, and a use in carbon dioxide capture.

BACKGROUND

Human dependence on fossil energy leads to excessive carbon dioxide ($CO_2$) emissions. A continued increase in carbon dioxide in the atmosphere has led to a series of serious climate problems. Although an amine solution absorption method is still a most mature post-combustion $CO_2$ capture technology at present, the technology has disadvantages such as easy volatilization, large area corrosion to equipment and release of toxic pollutants, moreover, due to high adsorption enthalpy thereof, a large amount of energy is required for regeneration. Compared with high energy consumption of a chemical absorption method, a porous adsorption material has attracted widespread attention as an alternative solution. The porous adsorption material generally has the advantages of fast adsorption kinetics, low regeneration cycle energy, no corrosion to the equipment, no release of toxic pollutants and the like. Common physical adsorbents include a porous carbon, a zeolite, an ionic liquid, a metal-organic framework, and a porous organic polymer and the like.

Specially, a metal-organic frameworks (MOFs) material is a three-dimensional network structure formed by a metal ion and an organic ligand connected through a coordination bond. The MOFs material is a kind of organic-inorganic hybrid porous material, which has characteristics such as a large specific surface area, a high porosity, a porous channel structure and an easily adjustable property. Due to above unique advantages, the MOFs have been rapidly developed in many fields such as separation, sensing, and catalysis. Ideally, a practical adsorbent for capturing a trace amount of carbon dioxide not only has an excellent adsorption property (for example, high adsorption capacity/selectivity, low adsorption enthalpy, resistance to water vapor), but also has excellent stability and recyclability. However, preparing the MOFs remains a huge challenge because it is extremely difficult to achieve these characteristics simultaneously in the MOFs. Therefore, $CO_2$ capture can be effectively achieved by designing and modifying a porous channel through rational use of a solvent template effect, thereby promoting a practical application of the MOFs material in the field of carbon capture.

SUMMARY

In view of problems existing in the prior art, the present disclosure provides a calcium-based metal-organic framework material, a method for making the same, and a use in carbon dioxide capture.

The present invention is implemented through the following technical solutions.

A calcium-based metal-organic framework material, and the calcium-based metal-organic framework material is a porous material with a three-dimensional framework structure formed by self-assembly coordination of a metal ion $Ca^{2+}$ and an organic ligand 2,5-pyrazinedicarboxylic acid;

a structural formula of the 2,5-pyrazinedicarboxylic acid is:

the three-dimensional framework structure is formed by a coordination bond between a one-dimensional calcium chain and a nitrogen atom and an oxygen atom of the organic ligand; and the one-dimensional calcium chain is provided with a broken line shape and includes a plurality of mononuclear calcium nodes, and each of the plurality of mononuclear calcium nodes is provided with an eight-coordinated mode.

In some embodiments, in the three-dimensional framework structure, each of the plurality of mononuclear calcium nodes is respectively coordinated to two nitrogen atoms and six oxygen atoms from six organic ligands, specifically, four oxygen atoms come from four different organic ligands, one nitrogen atom and one oxygen atom come from a same organic ligand, and the other one nitrogen atom and one oxygen atom come from the other organic ligand;

a coordination mode of the organic ligand is: a N atom at one end of the organic ligand 2,5-pyrazinedicarboxylic acid is coordinated to one mononuclear calcium node, two O atoms of a carboxyl group of the organic ligand 2,5-pyrazinedicarboxylic acid respectively bridge the other three mononuclear calcium nodes, and in the organic ligand, N atoms at a symmetrical position and the two O atoms of the carboxyl group are coordinated to a calcium node in the other one-dimensional calcium chain in a same coordination mode; and the three-dimensional framework structure is obtained by an infinite extension and stacking of the coordination mode in space.

In some embodiments, in the three-dimensional framework structure, bond lengths of Ca—O bonds are 2.444 Å, 2.457 Å and 2.465 Å respectively, and a bond length of a Ca—N bond is 2.605 Å; and in the three-dimensional framework structure, a one-dimensional porous channel with a size of 14.2 Å×7.6 Å$^2$ is provided along a C-axis, a porous channel shape is diamond and a pore volume is 38%.

In some embodiments, from a perspective of skeleton connection construction, when a porous channel of the calcium-based metal-organic framework material is provided with an acetonitrile guest molecule, a crystal structure of the calcium-based metal-organic framework material belongs to a monoclinic system, a space group is $C_2/c$, and unit cell parameters includes: a=9.0894(3) Å, b=16.5853(5) Å, c=5.8655(2) Å, α=γ=90°, β=92.184(3)°.

In some embodiments, the unit cell parameters of the calcium-based metal-organic framework material change after removing the acetonitrile guest molecule, the crystal structure of the calcium-based metal-organic framework material still belongs to the monoclinic system, the space group is still $C_2/c$, and the unit cell parameters includes: a=8.9931(5) Å, b=16.6295(7) Å, c=5.8713(2) Å, α=γ=90°, β=92.205(5)°.

In some embodiments, the unit cell parameters of the calcium-based metal-organic framework material change after removing the acetonitrile guest molecule and adsorbing a $CO_2$ molecule, the crystal structure of the calcium-based metal-organic framework material still belongs to the monoclinic system, the space group is still $C_2/c$, and the unit cell parameters includes: a=8.9035(4) Å, b=16.6510(8) Å, c=5.8643(3) Å, α=γ=90°, β=92.082(5)°.

The present disclosure further provides a preparation method of the calcium-based metal-organic framework material, including the following steps:

under a sealed condition, the 2,5-pyrazinedicarboxylic acid ($H_2PZDC$) and a calcium salt undergo a solvothermal reaction in a mixed solution of N,N-dimethylformamide (DMF), acetonitrile (MeCN) and water ($H_2O$), to obtain a crystal of the metal-organic framework material.

In some embodiments, a molar ratio of the 2,5-pyrazine dicarboxylic acid ($H_2PZDC$) to the calcium salt is 1:1, and each 1 mmol of calcium nitrate corresponds to (17.5 to 24) mL of DMF, (7.5 to 10) mL of acetonitrile, and (1 to 3.3) mL of water; and a temperature of the solvothermal reaction is 80° C. to 100° C., and a reaction time is 6 to 24 hours.

The present disclosure further provides a use of the calcium-based metal-organic framework material in $CO_2$ capture.

Beneficial Effects of the Present Disclosure are as Follows

The present disclosure provides the calcium-based metal-organic framework material formed by a solvothermal method using the organic ligand 2,5-pyrazine dicarboxylic acid and the calcium salt, and the calcium-based metal-organic framework material can undergo a framework structure transformation after removing the acetonitrile guest molecule and adsorbing the $CO_2$ molecule. The present disclosure uses acetonitrile as a template to construct a metal-organic framework material, and due to a similarity between acetonitrile and the $CO_2$ molecule, the MOF has potential applications in the $CO_2$ capture.

DESCRIPTION OF EMBODIMENTS

The present disclosure is described clearly below in conjunction with embodiments, apparently, the present disclosure is not limited to the following embodiments.

Example 1

Weighing a commercially purchased ligand $H_2PZDC$ (0.3 mmol) and $Ca(NO_3)_2 \cdot 4H_2O$ (0.3 mmol) or $CaCl_2$ (0.3 mmol) and placing in a 20 mL glass vial, adding 7.2 mL DMF solution, 3 mL acetonitrile solution and 1 mL water, then sealing the glass vial and placing in an ultrasonic instrument, and ultrasounding at room temperature for 5 minutes. After sealing, placing the glass vial in a 100° C. oven to react for 24 hours. After reaction is completed, turning off the oven, cooling to the room temperature, filtering and collecting solid particles obtained in the glass vial, then washing the solid particles with DMF and acetonitrile successively (5 mL×3), and a light yellow transparent strip crystal [Ca(PZDC)(MeCN)] is obtained by observing under a microscope, (yield: 98%, based on the $H_2PZDC$ ligand).

Example 2

Weighing a commercially purchased ligand $H_2PZDC$ (2.0 mmol) and $Ca(NO_3)_2 \cdot 4H_2O$ (2.0 mmoL) or $CaCl_2$ (2.0 mmol) and placing in a 100 mL round-bottom flask, adding 35 mL DMF, 15 mL acetonitrile solution and 2 mL water, then sealing the round-bottom flask and placing in an ultrasonic instrument, and ultrasounding at room temperature for 5 minutes. After sealing, placing the round-bottom flask in a 80° C. oil bath pot and stirring and reacting for 6 hours. After reaction is completed, turning off the oil bath pot, cooling to the room temperature, centrifugal filtering and collecting solid powder obtained in the round-bottom flask, then washing the solid powder with DMF and acetonitrile solution successively (5 mL×3), and a white powder crystal [Ca(PZDC)(MeCN)] is obtained by observing under the microscope, (yield: 95%, based on the $H_2PZDC$ ligand).

Results are the same, see the following for details:
(1) Determination of a Crystal Structure:

Selecting a single crystal with appropriate size, and at 293 K, collecting data using a PANalytical X'Pert PRO high-resolution powder diffractometer. Collection of the data is performed using a Cu-Ka (λ=1.5406 Å) target radiation ray monochromated by a graphite monochromator. Absorption correction of the data is performed using an SCALE3 ABSPACK software. The crystal structure is solved by a direct method using an SHELXTL-97 program. First, coordinates of all non-hydrogen atoms are determined using a difference function method and a least squares method, and positions of hydrogen atoms are obtained by a theoretical hydrogenation method, and then the crystal structure is refined using the SHELXTL-97 program. Crystallographic data are shown in Table 1. The first column is data of a crystal structure obtained in Example 1 and Example 2; the second column is data of a crystal structure after removing a guest molecule (the single crystal is immersed in an acetonitrile solvent, the acetonitrile solvent is replaced every 12 hours, and after three days of replacement, degassing at 200° C. under vacuum for 12 hours); and the third column is data of a crystal structure after removing the guest molecule and adsorbing carbon dioxide.

Figure 4:
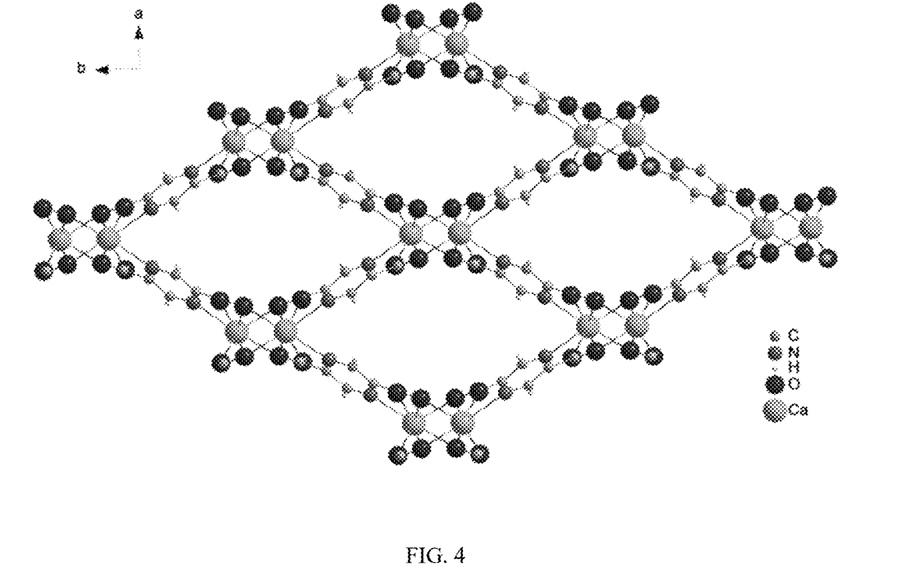
FIG. 4 is a three-dimensional structure diagram of the calcium-based metal-organic framework material obtained by Example 1 and Example 2.

A three-dimensional framework structure is obtained through an infinite extension and stacking in space of the coordination mode of the ligand and the mononuclear Ca nodes. Referring to FIG. 4, in the three-dimensional framework structure, bond lengths of Ca—O bonds are 2.444 Å, 2.457 Å and 2.465 Å respectively; a bond length of a Ca—N bond is 2.605 Å; and a one-dimensional porous channel with a size of 14.2 Å×7.6 Å$^2$ is provided along a C-axis, a porous channel shape is diamond and a pore volume is 38%.

TABLE 1

Crystallographic data of a calcium-based metal-organic framework material

| molecular formula | $C_{7.3}H_{5.8}N_{2.6}O_{3.9}Ca$ | $C_6H_2N_2O_4Ca$ | $C_{6.6}H_2N_2O_{5.2}Ca$ |
|---|---|---|---|
| molecular weight | 230.5 | 206.17 | 232.58 |
| temperature | 293K | 250K | 250K |
| crystal system | monoclinic | monoclinic | monoclinic |
| space group | C2/c | C2/c | C2/c |
| unit cell parameters | a = 9.0894(3) Å<br>b = 16.5853(5) Å<br>c = 5.8655(2) Å<br>α = 90°<br>β = 92.183(3)°<br>γ = 90° | a = 8.9931(5) Å<br>b = 16.6295(7) Å<br>c = 5.8713(3) Å<br>α = 90°<br>β = 92.203(5)°<br>γ = 90° | a = 8.9035(4) Å<br>b = 16.6510(8) Å<br>c = 5.8643(3) Å<br>α = 90°<br>β = 92.082(5)°<br>γ = 90° |
| density (calculated) | 1.7326 mg/m$^3$ | 1.5606 mg/m$^3$ | 1.7779 mg/m$^3$ |
| wavelength | 1.54184 Å | 1.54184 Å | 1.54184 Å |
| θ angle range | 10.66-145.14° | 10.64-147.38° | 10.62-146.76° |
| refinement method | least square method | least square method | least square method |
| absorption correction | multi-scans | multi-scans | multi-scans |
| goodness-of-fit based on F$^2$ | 1.308 | 1.092 | 1.099 |
| final R factor (I > 2σ (I)) | $R_1$ = 0.0422,<br>$wR_2$ = 0.1279 | $R_1$ = 0.0389,<br>$wR_2$ = 0.1051 | $R_1$ = 0.0432,<br>$wR_2$ = 0.1155 |
| R factor (all data) | $R_1$ = 0.0435,<br>$wR_2$ = 0.1290 | $R_1$ = 0.0423,<br>$wR_2$ = 0.1103 | $R_1$ = 0.0456,<br>$wR_2$ = 0.1191 |

A structure diagram of the calcium-based metal-organic framework material is shown in FIGS. 1-4.

Figure 1:
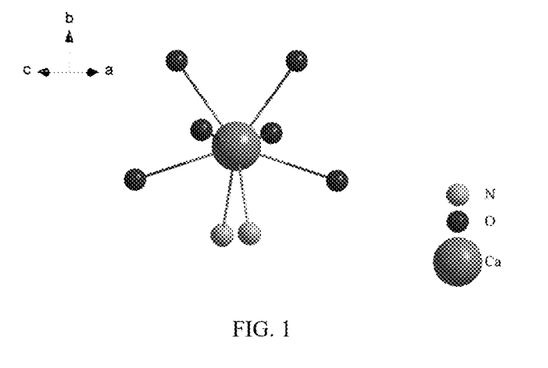
FIG. 1 is a coordination mode diagram of a mononuclear calcium node of a calcium-based metal-organic framework material obtained by Example 1 and Example 2.

FIG. 1 is a coordination mode diagram of a mononuclear calcium node of the calcium-based metal-organic framework material obtained by Example 1 and Example 2, it can be seen that each mononuclear calcium node has an eight-coordinated mode, and is coordinated to two nitrogen atoms and six oxygen atoms from six ligands. Specifically, four oxygen atoms come from four different ligands, one nitrogen atom and one oxygen atom come from a same ligand, and the other nitrogen atom and one oxygen atom come from the other ligand. A one-dimensional calcium chain with a broken line shape is formed between the mononuclear calcium nodes by bridging carboxylate oxygen atoms, referring to FIG. 2.

Figure 2:
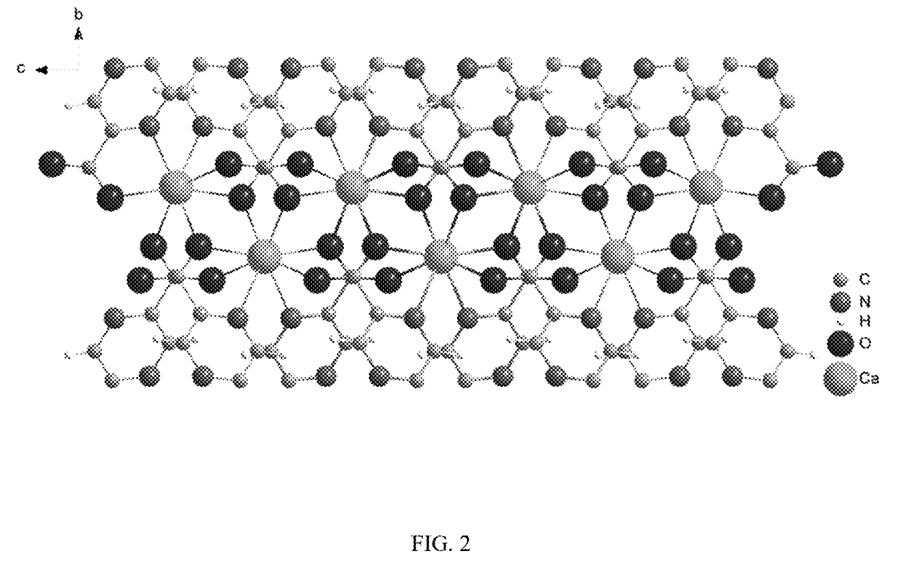
FIG. 2 is a structure schematic diagram of a one-dimensional calcium chain of the calcium-based metal-organic framework material obtained by Example 1 and Example 2.
Figure 3:
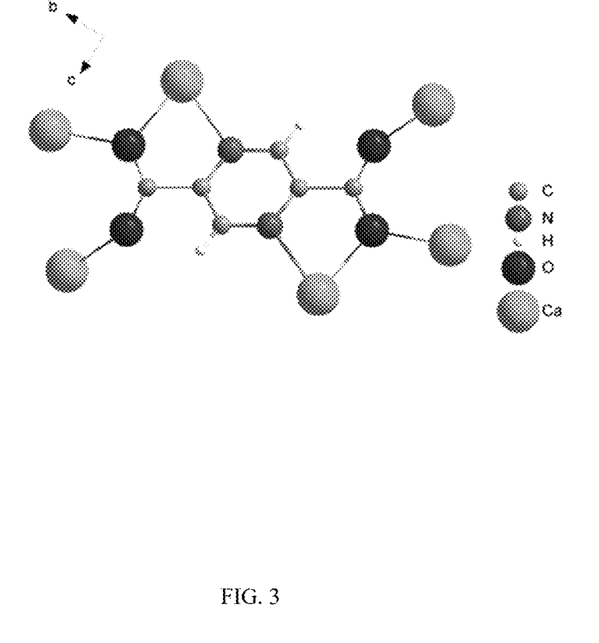
FIG. 3 is a coordination mode diagram of a ligand of the calcium-based metal-organic framework material obtained by Example 1 and Example 2.

FIG. 2 is a coordination mode diagram of a ligand of the calcium-based metal-organic framework material obtained by Example 1 and Example 2, it can be seen that a coordination mode of the ligand is: a N atom at one end of a 2,5-pyrazinedicarboxylic acid ligand is coordinated to a mononuclear calcium node, two O atoms of a carboxyl group in the ligand respectively bridge the other three mononuclear calcium nodes, and in the ligand, N atoms at a symmetrical position and two O atoms of the carboxyl group are coordinated to a calcium node in the other one-dimensional calcium chain in a same coordination mode.

Figure 5:
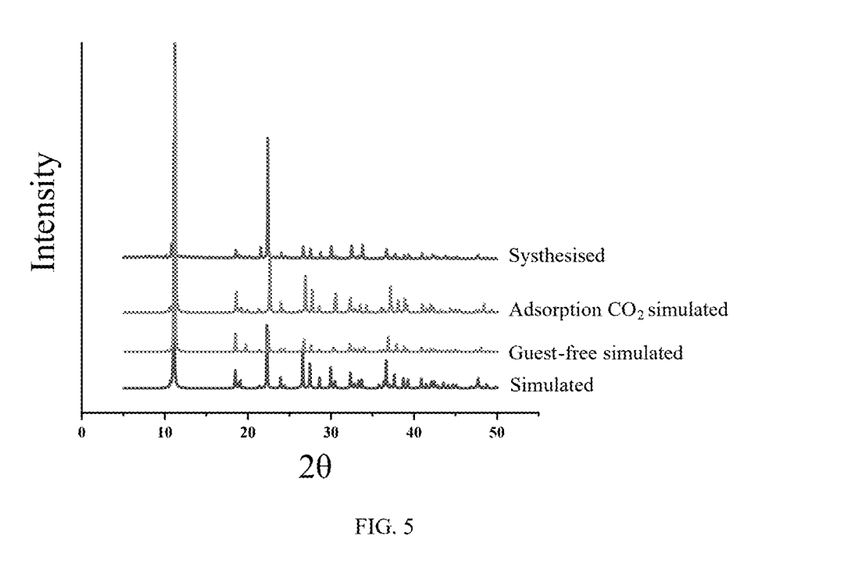
FIG. 5 is an XRD diagram of a crystal obtained by Example 1 and Example 2, a crystal after removing a guest molecule and a crystal after adsorbing carbon dioxide.

Characterization of Materials:

The calcium-based metal-organic framework material obtained by Example 1 and Example 2 are characterized by X-ray diffraction and thermogravimetric analysis. FIG. 5 is an XRD diagram of the crystal obtained by Example 1 and Example 2, the crystal after removing the guest molecule and the crystal after adsorbing carbon dioxide, it can be seen from FIG. 5 that the single crystal is synthesized into a pure phase, and that a structure is not changed before and after removing the guest molecule and after adsorbing carbon dioxide is confirmed by XRD.

Figure 6:
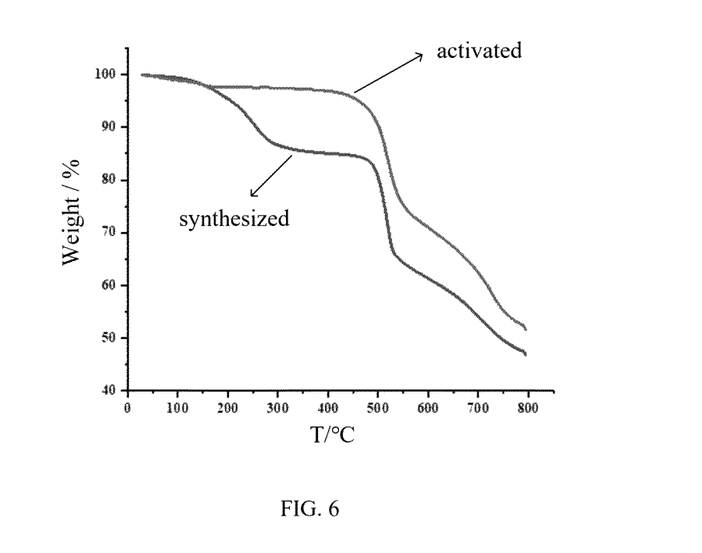
FIG. 6 is a thermal stability analysis diagram of the calcium-based metal-organic framework material obtained by Example 1 and Example 2 before and after degassing.

FIG. 6 is a thermal stability analysis diagram of the calcium-based metal-organic framework material obtained by Example 1 and Example 2 before and after degassing. It can be found that thermal stability of the structure of the calcium-based metal organic framework material remains unchanged before and after vacuum heating degassing, and a collapse temperature is maintained at 470° C. At the same time, it is also proved that solvent molecules in a porous channel without a guest phase after heating degassing are completely removed.

Figure 7:
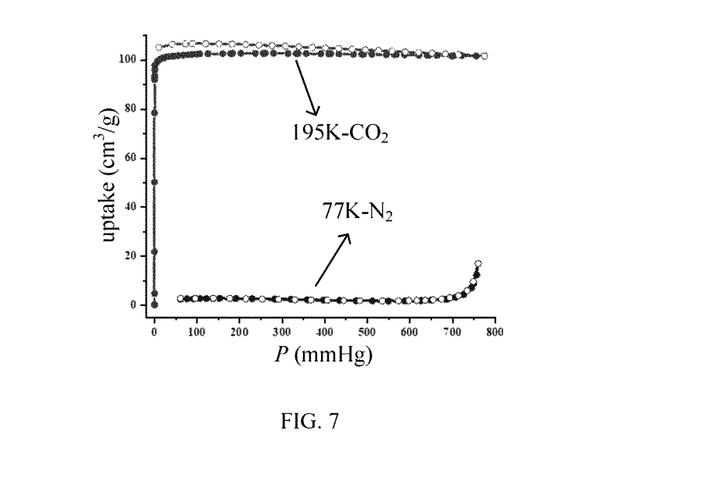
FIG. 7 is an adsorption isotherm of $N_2$ at 77K and an adsorption isotherm of $CO_2$ at 195K of the calcium-based metal-organic framework material obtained by Example 1 and Example 2.

(2) Gas Adsorption Test Characterization:

FIG. 7 is an adsorption isotherm of $N_2$ at 77 K and an adsorption isotherm of $CO_2$ at 195 K of the calcium-based metal-organic framework material obtained by Example 1 and Example 2.

It can be seen from FIG. 7 that the metal-organic framework has no adsorption of $N_2$ at 77 K, which is because a porous channel limitation at 77 K prevents a nitrogen gas molecule from entering the porous channel; and a specific surface area of the metal-organic framework can be calculated to be $S_{BET}=517.77$ m$^2$ g$^{-1}$ by a $CO_2$ adsorption capacity at 195 K.

Figure 8:
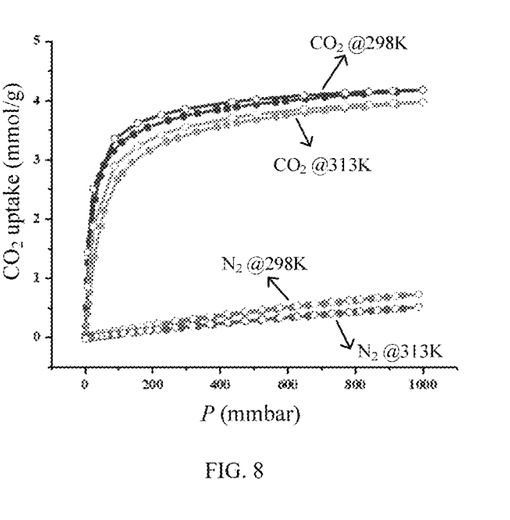
FIG. 8 is adsorption isotherms of the calcium-based metal-organic framework material obtained by Example 1 and Example 2 for carbon dioxide and nitrogen gas at 298 and 313 K.

FIG. 8 is adsorption isotherms of the calcium-based metal-organic framework material obtained by Example 1 and Example 2 for carbon dioxide and nitrogen gas at 298 and 313 K. As shown in FIG. 8, the $CO_2$ adsorption capacity of the calcium-based metal-organic framework material is about 2.7 mmol at 298 K and 40 mbar, and about 4.2 mmol at normal pressure; and the $CO_2$ adsorption capacity is about 1.8 mmol at 313K and 40 mbar, and about 4.0 mmol at normal pressure; thereby proving an ability to capture $CO_2$ in a gas power plant environment thereof.

Figure 9:
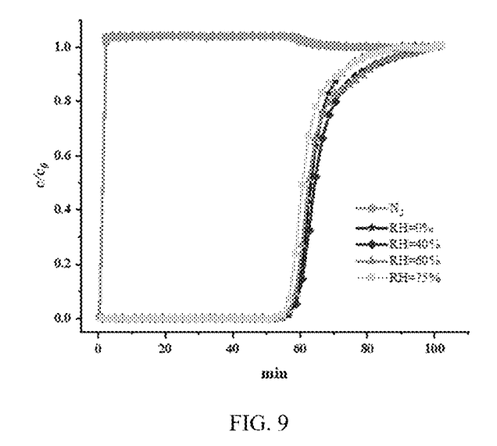
FIG. 9 is a breakthrough experiment result diagram of the calcium-based metal-organic framework material obtained by Example 1 and Example 2 under simulated flue gas ($CO_2$: $N_2$=4:96) conditions with different humidity.

Breakthrough Experiment:

The breakthrough experiment is carried out by simulating an industrial separation condition, and a mixed gas of $CO_2$: $N_2$=4:96 is selected for the breakthrough experiment. Before the breakthrough experiment, the metal-organic framework is put into a filling column, and degassing is carried out by vacuum heating; after the degassing is completed, a mass flow meter is turned on to control the mixed gas for the breakthrough experiment, the mixed gas passes through a breakthrough column and enters a mass spectrometer for analysis of gas composition and content. Breakthrough experiments under different humidity are set by adjusting a parameter of a flow meter. As shown in FIG. 9, it can be found that a $CO_2$ breakthrough time of each 360 mg sample is maintained at 55 minutes, the adsorption capacity is substantially consistent with a static adsorption capacity at 40 mmbar, and although a relative humidity increases to 75%, a $CO_2$ capture performance of the metal-organic framework does not decrease.

Figure 10:
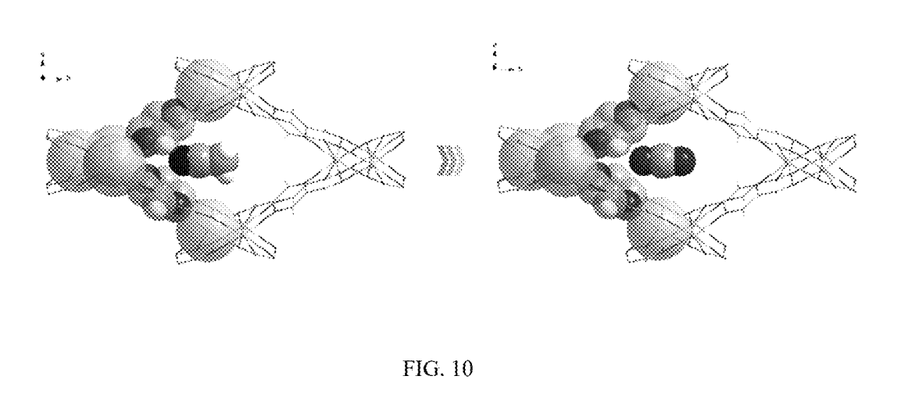
FIG. 10 is a schematic diagram of a single crystal structure analysis of the crystal after adsorbing carbon dioxide.

(3) $CO_2$ Adsorption Mechanism:

A single crystal structure analysis of the crystal after adsorbing $CO_2$ gas is further performed, as shown in FIG. 10, a position of a $CO_2$ molecule adsorbed by the material of the present disclosure is a position of an acetonitrile molecule.

The invention claimed is:

1. A calcium-based metal-organic framework material, wherein: the calcium-based metal-organic framework material is a porous material with a three-dimensional framework structure formed by self-assembly coordination of a metal ion $Ca^{2+}$ and an organic ligand 2,5-pyrazinedicarboxylic acid; a structural formula of the 2,5-pyrazinedicarboxylic acid is:

the three-dimensional framework structure is formed by a coordination bond between a one-dimensional calcium chain and a nitrogen atom and an oxygen atom in the organic ligand; and the one-dimensional calcium chain is provided with a broken line shape, and comprises a plurality of mononuclear calcium nodes; and each of the plurality of mononuclear calcium nodes is provided with an eight-coordinated mode;

wherein from a perspective of skeleton connection construction, when a porous channel of the calcium-based metal-organic framework material is provided with an acetonitrile guest molecule, a crystal structure of the calcium-based metal-organic framework material belongs to a monoclinic system, a space group is C2/c, and unit cell parameters comprises: a=9.0894(3) Å, b=16.5853(5) Å, c=5.8655(2) Å, α=γ=90°, β=92.184(3)°.

2. The calcium-based metal-organic framework material of claim 1, wherein in the three-dimensional framework structure, bond lengths of Ca—O bonds are 2.444 Å, 2.457 Å and 2.465 Å respectively, and a bond length of a Ca—N bond is 2.605 Å; and in the three-dimensional framework structure, a one-dimensional porous channel with a size of 14.2 Å×7.6 Å$^2$ is provided along a C-axis, a porous channel shape is diamond and a pore volume is 38%.

3. The calcium-based metal-organic framework material of claim 1, wherein the unit cell parameters of the calcium-based metal-organic framework material change after removing the acetonitrile guest molecule, the crystal structure of the calcium-based metal-organic framework material still belongs to the monoclinic system, the space group is still C2/c, and the unit cell parameters comprises: a=8.9931(5) Å, b=16.6295(7) Å, c=5.8713(2) Å, α=γ=90°, β=92.205(5)°.

4. The calcium-based metal-organic framework material of claim 1, wherein the unit cell parameters of the calcium-based metal-organic framework material change after removing the acetonitrile guest molecule and adsorbing a $CO_2$ molecule, the crystal structure of the calcium-based metal-organic framework material still belongs to the monoclinic system, the space group is still C2/c, and the unit cell parameters comprises: a=8.9035(4) Å, b=16.6510(8) Å, c=5.8643(3) Å, α=γ=90°, β=92.082(5)°.

* * * * *